(12) United States Patent
Golgotiu et al.

(10) Patent No.: US 8,955,252 B2
(45) Date of Patent: Feb. 17, 2015

(54) AUTOMATED GRAVIMETRIC SCREENING PLATFORM SYSTEM AND METHOD

(75) Inventors: Kirsti A. Golgotiu, Oregon City, OR (US); Philippe Herve, Brussels (BE); Douglas Keller, West Linn, OR (US); Troy M. Swartwood, Seattle, WA (US); Jeffrey D. Donaldson, Tigard, OR (US)

(73) Assignee: Dow Agrosciences LLC, Indianapolis, IN (US)

(*) Notice: Subject to any disclaimer, the term of this patent is extended or adjusted under 35 U.S.C. 154(b) by 322 days.

(21) Appl. No.: 13/444,095

(22) Filed: Apr. 11, 2012

(65) Prior Publication Data

US 2012/0260569 A1    Oct. 18, 2012

Related U.S. Application Data

(60) Provisional application No. 61/476,055, filed on Apr. 15, 2011.

(51) Int. Cl.
*A01G 31/02* (2006.01)
*A01G 7/00* (2006.01)
(Continued)

(52) U.S. Cl.
CPC ..... *A01G 7/00* (2013.01); *A01G 9/247* (2013.01); *A01G 27/003* (2013.01)
USPC .................................. 47/65; 47/79; 47/65.5

(58) Field of Classification Search
CPC ......... A01G 9/02; A01G 27/02; A01G 9/025; A01G 1/001; A01G 9/14; A01G 9/023; A01G 7/00; A01G 9/16; A01G 9/20; A01G 27/06; A01G 31/02; A01G 7/045; A01G 9/021; A01G 9/022; A01G 9/045; A01G 31/00; A01G 9/00; A01G 25/16; A01G 9/104; A01G 1/007; A01G 25/02; A01G 27/003; A01G 31/042; A01G 31/06; A01G 33/00; G01G 19/083; G01G 19/445; G01G 23/3728; G01G 17/04; G01G 15/00; G01G 19/08; G01G 19/07; G01G 5/00; G01G 19/00; G01G 19/02; G01G 19/10; G01G 21/22; G01G 11/04; G01G 17/08

USPC ................ 47/65, 65.5, 39, 17, 18, 19.1, 66.7, 47/66.6, 79, 81, 59 R, 62 R, 63, 62 E; 177/130, 146

See application file for complete search history.

(56) References Cited

U.S. PATENT DOCUMENTS

| | | | | |
|---|---|---|---|---|
| 3,293,799 A | * | 12/1966 | Keller et al. | 47/79 |
| RE27,234 E | * | 11/1971 | Smieja | 177/146 |

(Continued)

FOREIGN PATENT DOCUMENTS

| | | |
|---|---|---|
| DE | 285 919 | 1/1991 |
| SU | 952 167 | 8/1982 |
| WO | WO 2012042084 | 4/2012 |

OTHER PUBLICATIONS

Un automate de phenotypage pour cultivar des plantes a des etats hydriques du sol controles: Un aoutil d'aide a la cracterisation de la response de la croissance et de la transpiration a la sechersse; by, Myariam Dauzat, Emmanual Simon, Christine Granier, Philippe Hamard, Dertrand Muller, Angelique Christophe, Didier Combes, Francois Tardieu, Thier.*

(Continued)

*Primary Examiner* — Andrea Valenti
(74) *Attorney, Agent, or Firm* — Faegre Baker Daniels LLP; E. J. Kraus

(57) ABSTRACT

An automated gravimetric screening system and method controls soil moisture in a plurality of potted plants to perform water deficit experiments in a greenhouse using a stationary support platform and pot design that maintains the plants in a static location during the testing. By weighing and re-watering the pots from beneath the platform, the present system and method permits an upper gantry to capture high resolution images, temperature data, or other sensor data to quantify the plant stress level or plant canopy characteristics during the experiment.

22 Claims, 15 Drawing Sheets

(51) Int. Cl.
*A01G 9/24* (2006.01)
*A01G 27/00* (2006.01)

(56) References Cited

U.S. PATENT DOCUMENTS

| | | | | |
|---|---|---|---|---|
| 5,020,275 | A | * | 6/1991 | Bednarzik ........................ 47/79 |
| 5,241,786 | A | * | 9/1993 | Burns et al. ..................... 47/79 |
| 5,361,534 | A | * | 11/1994 | Burns et al. ..................... 47/79 |
| 5,611,172 | A | * | 3/1997 | Dugan et al. ............... 47/1.01 R |
| 5,852,896 | A | | 12/1998 | Flasch, Jr. |
| 6,124,554 | A | * | 9/2000 | Muckle et al. ................ 177/126 |
| 6,314,340 | B1 | * | 11/2001 | Mecham et al. ............. 700/284 |
| 8,584,397 | B1 | * | 11/2013 | Marsh ........................... 47/48.5 |
| 2005/0086861 | A1 | * | 4/2005 | Atchley ........................ 47/65.5 |
| 2010/0031568 | A1 | | 2/2010 | Burnett |
| 2010/0286833 | A1 | * | 11/2010 | Kaprielian ................... 700/284 |
| 2012/0042084 | A1 | | 2/2012 | Dutta et al. |

OTHER PUBLICATIONS

Phenopsis, An automated platform for reproducible phenotyping of plant responses to soil water deficit in *Arabidopsis thaliana* permitted the identification of an accession with low sensitivity to soil water deficit, New Phytologist (Jan. 2006) 169:623-635, by Christine Granier et al.*

Sinclair, T.R., and M.M. Ludlow, 1986, Influence of soil water supply on the plant water balance of four tropical grain legumes, Aust. J. Plant Physiol, 13:329-341.

Schwaegerle, K.E., 1983, A method for maintaining constant soil moisture availability for plants, Soil Sci. Soc. Am. J., 47:608-610.

Ray, J.D., and T.R. Sinclair, 1998, The effect of pot size on growth and transpiration of maize and soybean during water deficit stress, J. Exp. Bot., 49:1381-1386.

Pennypacker, B.W., K.T. Leath, W.L. Stout, and R.R. Hill, Jr. 1990, Technique for simulating field drought stress in the greenhouse, Agron. J., 82:951-957.

Ray, J.D. and T.R. Sinclair, 1997, Stomatal closure of maize hybrids in response to drying soil, Crop Sci., 37:803-807.

Gulaev, B I et al. Plant watering device—has extra time relay, operating drive of weighing device, which has balance fixed of motor shafts/x-ms. WPI/Thomson, Aug. 23, 1982. XP007920907, abstract.

International Search Report and Written Opinion in corresponding PCT Application No. PCT/US2012/033054, Aug. 17, 2012, 13 pages.

English translation of Dauzat et al. Un automate de phenotypage pour cultivar des plantes a des etats hydriques du sol controles: Un aoutil d'aide a la caracterisation de la reponse de la croissance et de la transpiration a la sechersse: by, Myariam Dauzat, Emmanual Simon, Christine Granier, Philippe Hamard, Dertrand Muller, Angelique Christophe, Didier Combes, Francois Tardieu, Thierry Simonneau (translation of article provided in Office Action dated Jun. 10, 2014).

* cited by examiner

AUTOMATED GRAVIMETRIC SCREENING PLATFORM SYSTEM AND METHOD

CROSS REFERENCE TO RELATED APPLICATION

This application claims the benefit of U.S. Provisional Patent Application Ser. No. 61/476,055, filed Apr. 15, 2011, the disclosure of which is expressly incorporated by reference herein.

BACKGROUND AND SUMMARY OF THE DISCLOSURE

The present disclosure relates to a system and method for providing controlled soil moisture conditions within potted plants in a large-scale, automated gravimetric screening system, typically located in a greenhouse.

The gravimetric method is a known technique of imposing a precision drought stress regime on plants growing in containers or pots by measuring changes in the mass of the pot. Measuring the pot mass provides an accurate calculation of changes in soil moisture, and rewater values are determined by calculating the difference between the actual water content and the desired water content based on a predetermined water deficit program. With appropriate control of evaporative water loss from the soil, the gravimetric method allows for determination of plant transpiration and total plant water use through the duration of an experiment.

Typically, gravimetric screening is a highly labor intensive process that limits throughput and capacity in screening specific programs. Conventional screening systems move individual pots to a weighing and re-watering station. In some cases, entire blocks of plants are moved as a unit to another location for weight measurements and re-watering. This movement introduces additional confounding effects to testing procedures such as vibrations during movement and low density growth conditions, for example, which are not typical in field environments. These known gravimetric screening systems do not make the most efficient use of greenhouse space.

The automated gravimetric screening system and method of the present disclosure provides a high throughput greenhouse screening system using a support platform and pot design that maintains the plants in a static location during the testing. The system includes a lower gantry located below the support platform which has a plurality of independent load cell modules and plumbing to weigh and supply water to each row of pots. In an illustrated embodiment, each row of pots is lifted simultaneously by the load cell modules to acquire weights, calculate how much water should be added to bring the pot to a desired mass, and then supply water to the pot based on the calculation. The lower gantry is aligned with each row of pots as it moves along the length of the support platform. An entire row of pots is illustratively weighed and re-watered simultaneously within a matter of minutes without moving the pots to a separate weighing station. By weighing and re-watering the pots from beneath the platform, the present system and method permits a high-speed automated upper gantry to capture high resolution images, temperature data, or other sensor data to quantify the plant stress level or plant canopy characteristics during the experiment.

The present system and method provides reduced noise and a more uniform and precisely controlled water stress environment for both well-watered and drought treatment groups. Improved control enables the comparison of measured physiological parameters with greater confidence as water stress is equal and uniform across the experiment.

The platform and gantry system illustratively uses a customized pot designed to work with the lower gantry positioned under the support platform for weighing and re-watering the pots. The illustrated pots enable re-watering from below the soil surface. Each pot illustratively includes a reservoir system configured to hold water therein. The reservoir system surrounds the soil column defined by the pot from a location just below a top surface of the soil to the bottom of the pot. An illustrated embodiment provides fluid communication from the reservoir system to soil is provided via a plurality of vertical fluid channels that extend along an internal circumference of the pot. In an illustrated embodiment, a synthetic fabric mesh covers the channels to prevent root and dirt debris accumulation in the channels of the reservoir. Water and/or nutrients are illustratively delivered into the reservoir through a load cell module and through a check valve located at the bottom of the pot. Upon contact with a support surface of a load cell module, an o-ring on the pot forms a seal around the check valve to reduce water loss. The pots deliver precise amounts of water to the soil column and result in healthy plant material with acceptable growth and development.

In one illustrated embodiment of the present disclosure, a system is provided for controlling soil moisture in a plurality of potted plants to perform water deficit experiments. The system includes a stationary platform having a plurality of openings formed therein. The openings are located in a plurality of rows on the platform. The system also includes a plurality of pots located in the plurality of openings in the platform. The pots are supported by the platform. A movable lower gantry is located below the platform. The movable lower gantry supports a plurality of load cell modules aligned with the plurality of pots located in a row of openings. Each load cell module includes a load cell having a support movable from a retracted position spaced apart from a bottom surface of a pot to an extended position in which the support of the load cell lifts the pot upwardly to support the weight of the pot thereon so that the load cell weighs the lifted pot. The system further includes a controller coupled to the load cell. The controller is programmed to determine whether the pots need watering based on the weights of the pots and the water deficit experiment. The system still further includes a water supply coupled to the load cell module. The water supply includes at least one flow control valve controlled by the controller to selectively supply water through the load cell module to the pot.

In an illustrated embodiment, the system further includes an upper gantry movable above the platform. The upper gantry including at least one sensor located thereon to acquire data related to the plants in the plurality of pots. Illustratively, the sensor is a camera to take images of the plants in the plurality of pots, a temperature sensor, or other sensor.

In another illustrated embodiment of the present disclosure, a method is provided for controlling soil moisture in a plurality of potted plants to perform water deficit experiments. The method includes providing a stationary platform having a plurality of openings therein, and locating a plurality of pots in the openings of the platform. The pots are supported by the platform. The method also includes lifting the pots with the plurality of load cell modules, weighing each of the plurality of pots with the load cell modules, determining whether the pots need to be watered based on the weight of the pots and the water deficit experiment, watering the pots through the load cell modules, if necessary, based on the determining step, and lowering the plurality of load cell modules so that the plurality of pots are supported by the platform.

In an illustrated embodiment, the openings in the platform are located in a plurality of rows. The step of moving a plurality of load cell modules under the platform aligns the load cell modules with a row of pots, and the step of lifting the pots lifts an entire row of pots with the plurality of load cell modules simultaneously. The method also includes moving the load cell modules to a next row of pots and performing the lifting, weighing, determining, watering, and lowering steps for the next row of pots.

In yet another illustrated embodiment of the present disclosure, a pot is provided for use with system for controlling soil moisture in a plurality of potted plants to perform water deficit experiments. The system includes a stationary platform having a plurality of openings formed therein. The pot includes a body portion having an open top end and a bottom end, and a flange coupled to the body portion adjacent the top end. The flange is configured to engage the platform to hold the body portion within an opening of the platform. The pot also includes a fluid reservoir having a bottom portion located adjacent the bottom end of the body portion, a plurality of vertically extending fluid channels extending upwardly toward the top end of the body portion, and a fill opening located at the bottom end of the body portion in communication with the bottom portion of the fluid reservoir. The pot further includes a check valve coupled to the fill opening to permit fluid to be supplied to the fluid reservoir from the bottom end of the body portion through fill opening and the check valve.

In an illustrated embodiment, the pot includes a mesh forming an inner portion of the vertically extending fluid channels. The mesh permits fluid to flow through the mesh to soil within the body portion, but preventing soil debris and plant roots from accumulating in the vertically extending fluid channels of the reservoir.

BRIEF DESCRIPTION OF THE DRAWINGS

The foregoing aspects and many additional features of the present system and method will become more readily appreciated and become better understood by reference to the following detailed description when taken in conjunction with the accompanying drawings.

Figure 1:
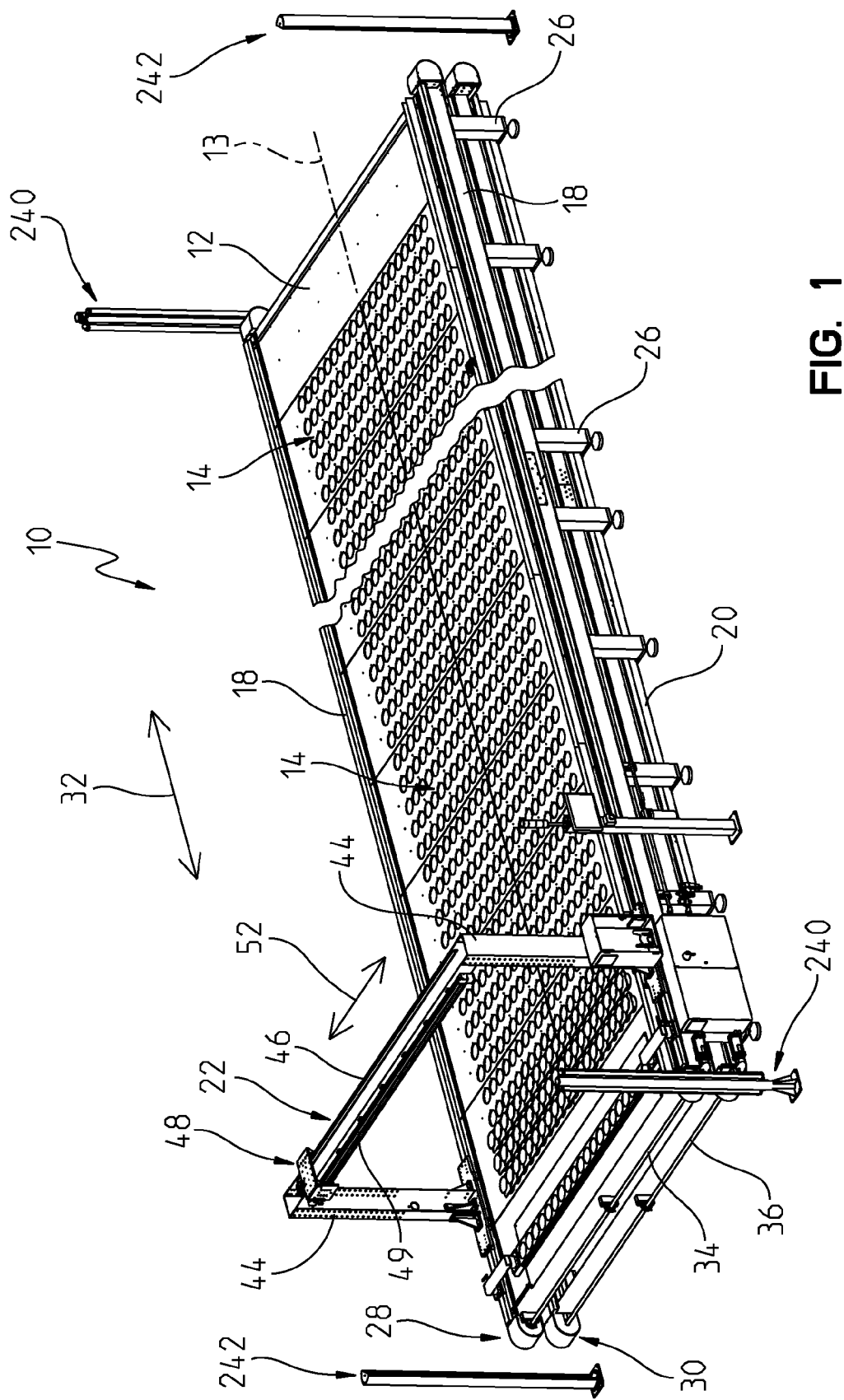
FIG. 1 is a perspective view of an automated gravimetric screening platform system in accordance with an illustrated embodiment of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It is understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
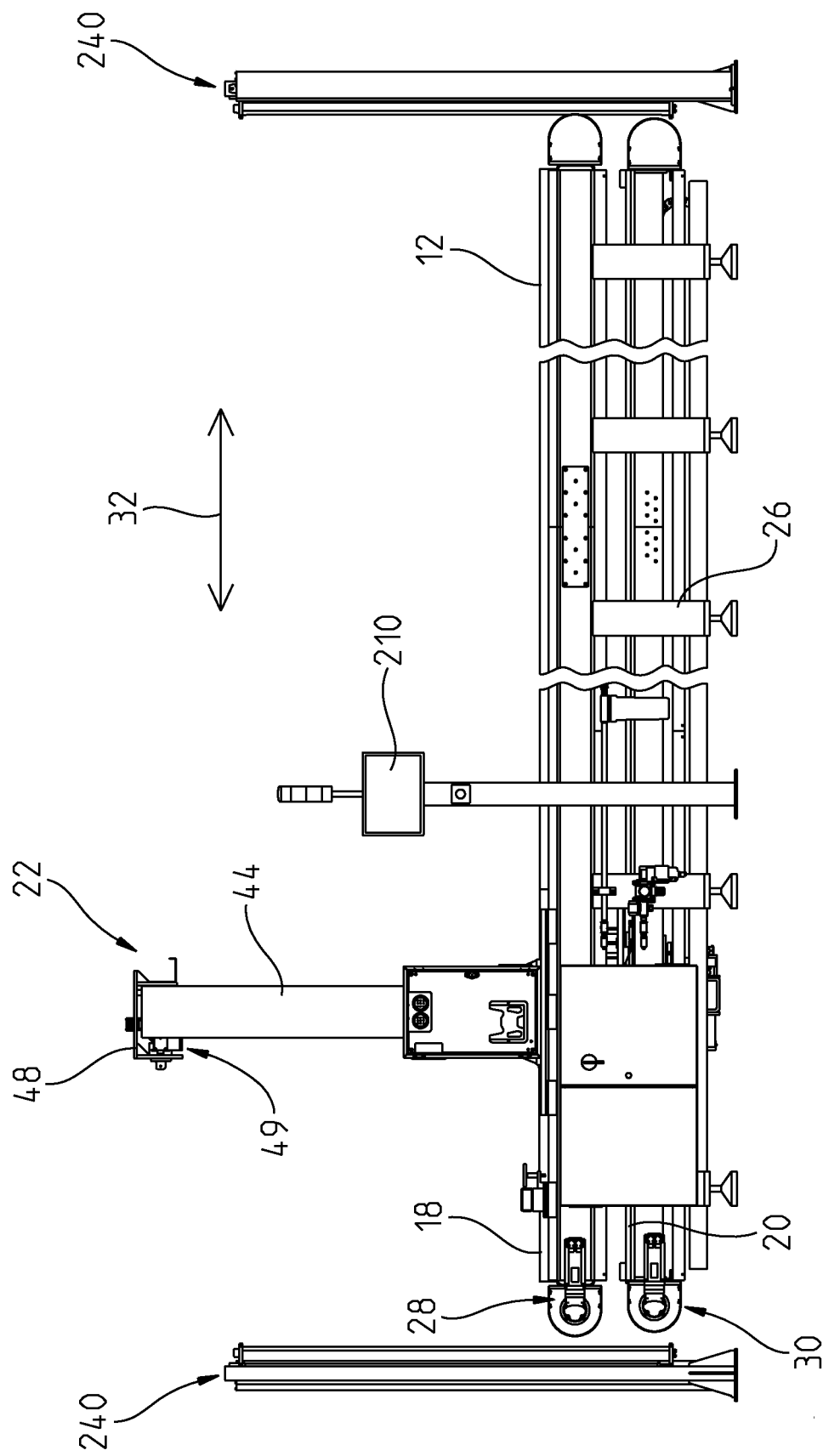
FIG. 2 is a side elevational view, with portions broken away, of the gravimetric screening platform system of FIG. 1.
Figure 3:
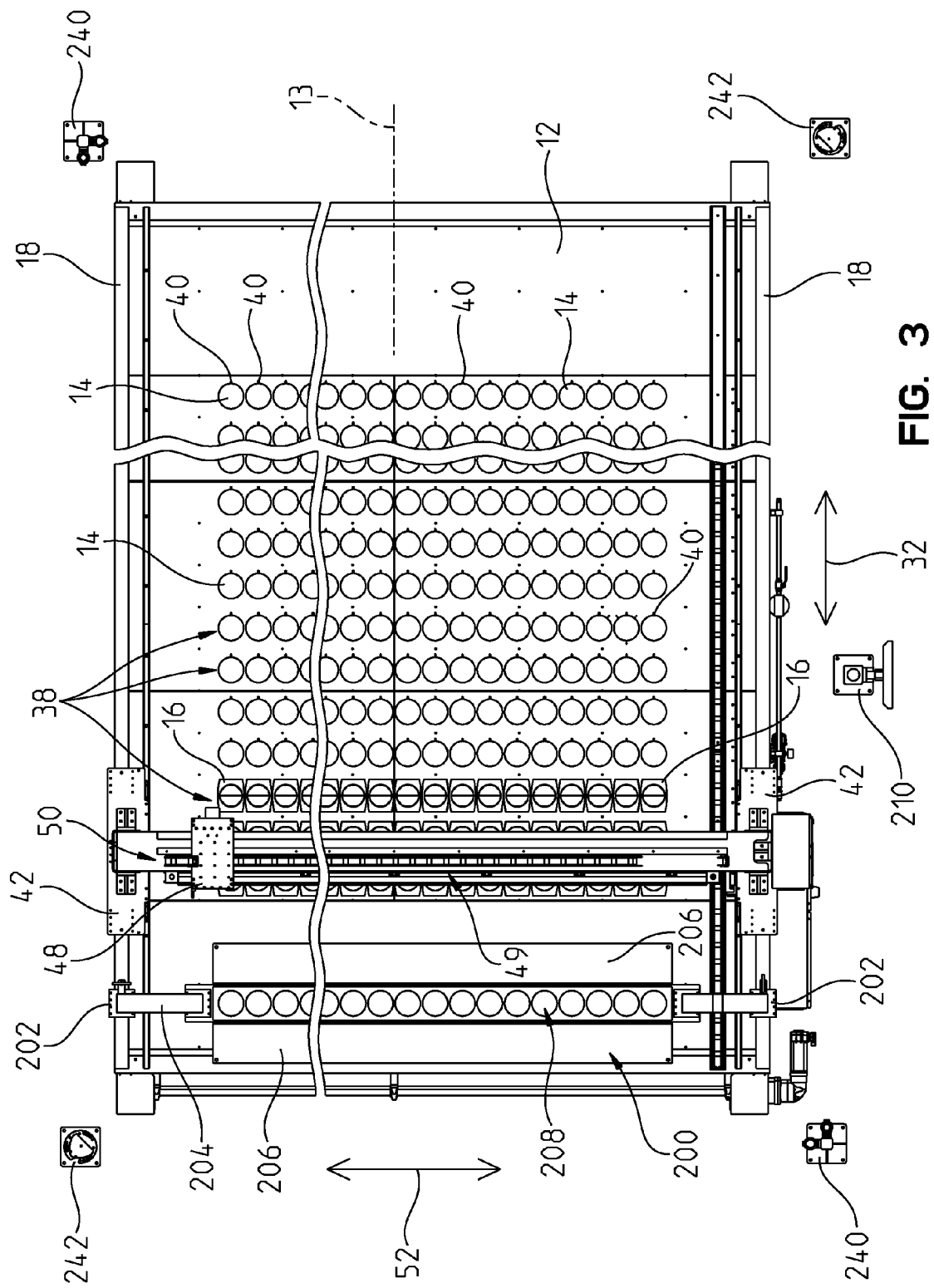
FIG. 3 is a top view, with portions broken away, of the gravimetric screening platform system of FIGS. 1 and 2.
Figure 4:
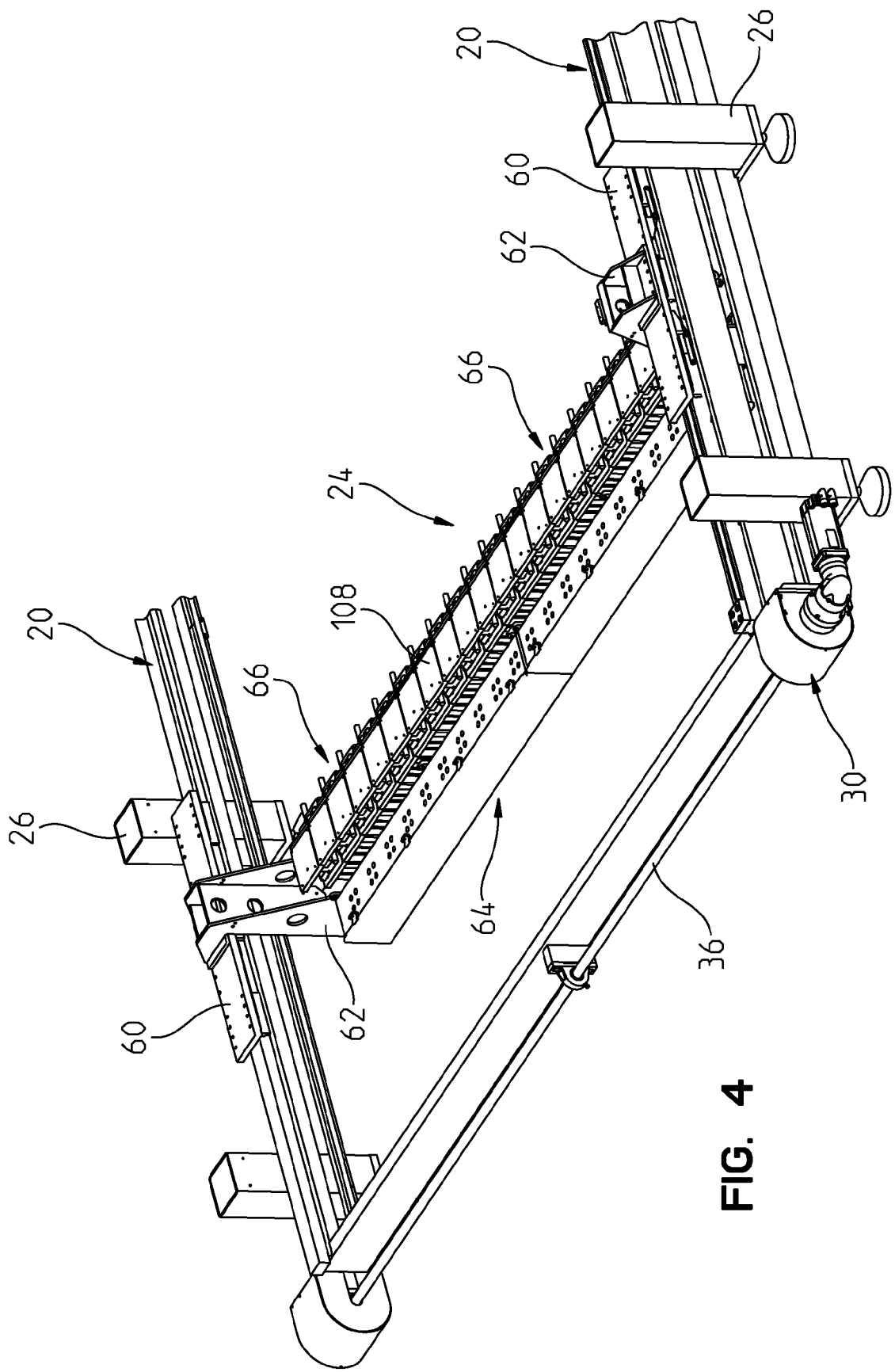
FIG. 4 is a perspective view illustrating a lower gantry including a plurality of load cell modules and a water delivery system for weighing and watering a plurality of pots of the gravimetric screening platform system.
Figure 5:
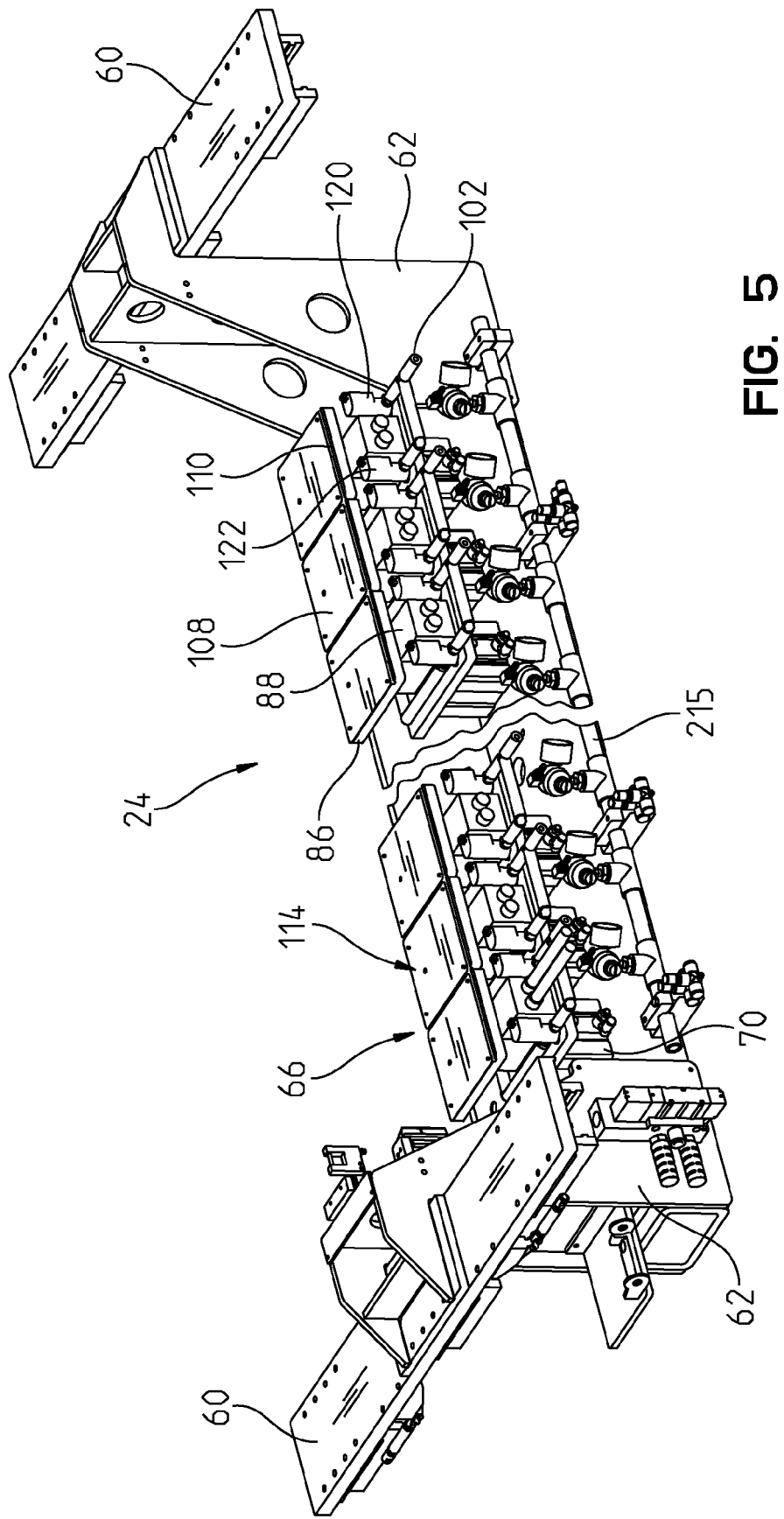
FIG. 5 is an enlarged perspective view, with portions broken away, of the lower gantry of FIG. 4.
Figure 6:
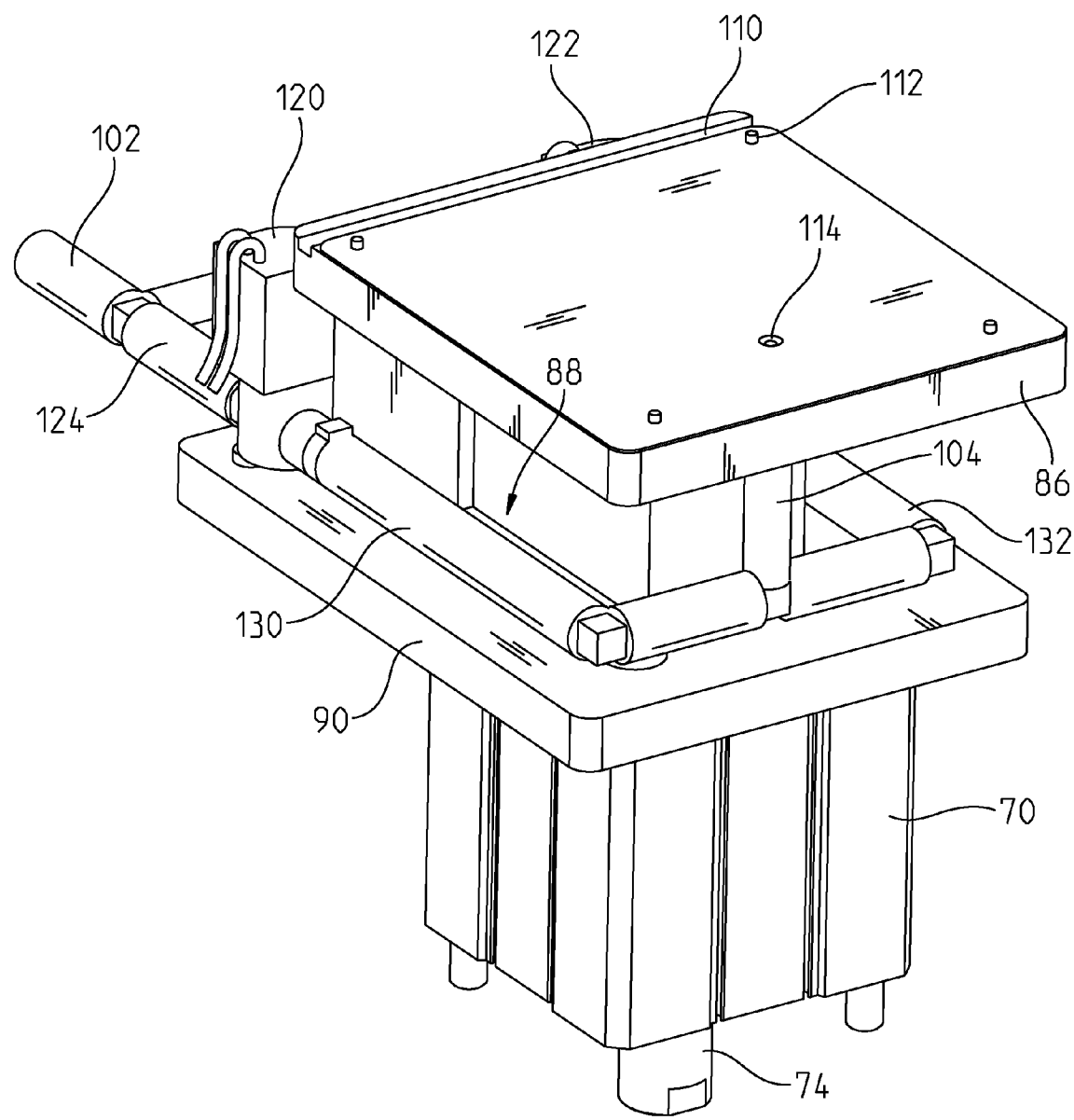
FIGS. 6 and 7 are perspective views of one of the load cell modules on the lower gantry.

Referring initially to FIGS. 1-3, an illustrated embodiment of a gravimetric screening platform system 10 is disclosed. The system 10 includes a stationary support platform 12 having a plurality of openings 14 formed therein. The openings 14 are configured to receive a plurality of specially configured containers or pots 16 therein for growing plants in a controlled environment as discussed herein. The system 10 includes a pair of upper tracks 18 and a pair of lower tracks 20 located on opposite sides of the support platform 12 for supporting upper and lower movable gantries 22 and 24. Upper gantry 22 is best shown in FIGS. 1-3, while lower gantry 24 is best shown in FIGS. 4 and 5. The platform 12 and tracks 18 and 20 are supported by a plurality of adjustable support legs 26 which are spaced apart around an outer periphery of the platform 12.

In an illustrated embodiment, upper and lower drive mechanisms 28 and 30 are configured to move the upper and lower gantries 22 and 24, respectively, back and forth on tracks 18 and 20 longitudinally relative to the platform 12 as illustrated by double headed arrow 32. In an illustrated embodiment, a chain drive system is used to move the upper and lower gantries 22 and 24 on tracks 18 and 20, respectively. Drive sprockets of drive mechanisms 28 and 30 on opposite sides of the platform 12 are connected by axles 34 and 36, respectively. Although a chain drive mechanism is illustratively used to move the upper and lower gantries 22 and 24, it is understood that other types of drive mechanisms, such as cable drives or other mechanical drives may also be used in other embodiments.

In an illustrated embodiment, the openings 14 of platform 12 are arranged in a plurality of rows 38 across the platform 12. As best shown in FIG. 3, each row 38 of openings 14 extends in a direction transverse to a longitudinal axis 13 of platform 12. In an illustrated embodiment, the platform 12 includes 44 rows, with 20 openings 14 in each row. However, any desired number of rows and openings per row may be used in accordance with the present disclosure.

As shown in FIG. 3, each of the openings 14 includes an alignment notch 40 extending away from one side of the opening 14 to align the pot 16 in a proper orientation within the openings 14 for watering as discussed below. FIG. 3 illustrates certain rows 38 having pots 16 therein in certain rows 38 without pots located within the openings 14.

The upper gantry 22 illustratively includes spaced apart movable supports or shuttle members 42 which ride on upper track members 18 as best shown in FIG. 3. In an illustrated embodiment, the shuttle members 42 slide back and forth along the tracks 18. The shuttle members 42 may include rollers, if desired, to facilitate movement of the upper gantry 22 back and forth in the direction of double headed arrow 32. Upper gantry 22 also includes spaced apart vertical supports 44 coupled to shuttle members 42 and a horizontal support 46 extending over the platform 12 between the spaced apart vertical supports 44.

A universal mounting block 48 is coupled to a track 49 provided on the horizontal support 46. As best shown in FIG. 3, a drive mechanism 50, such as a chain drive, is used to move the universal mounting block 48 back and forth in the direction of double headed arrow 52 in a direction transverse to the longitudinal axis 13 of support platform 12. Drive mechanism 50 therefore moves the universal mounting block 48 back and forth over the rows 38 of pots 16.

Figure 14:
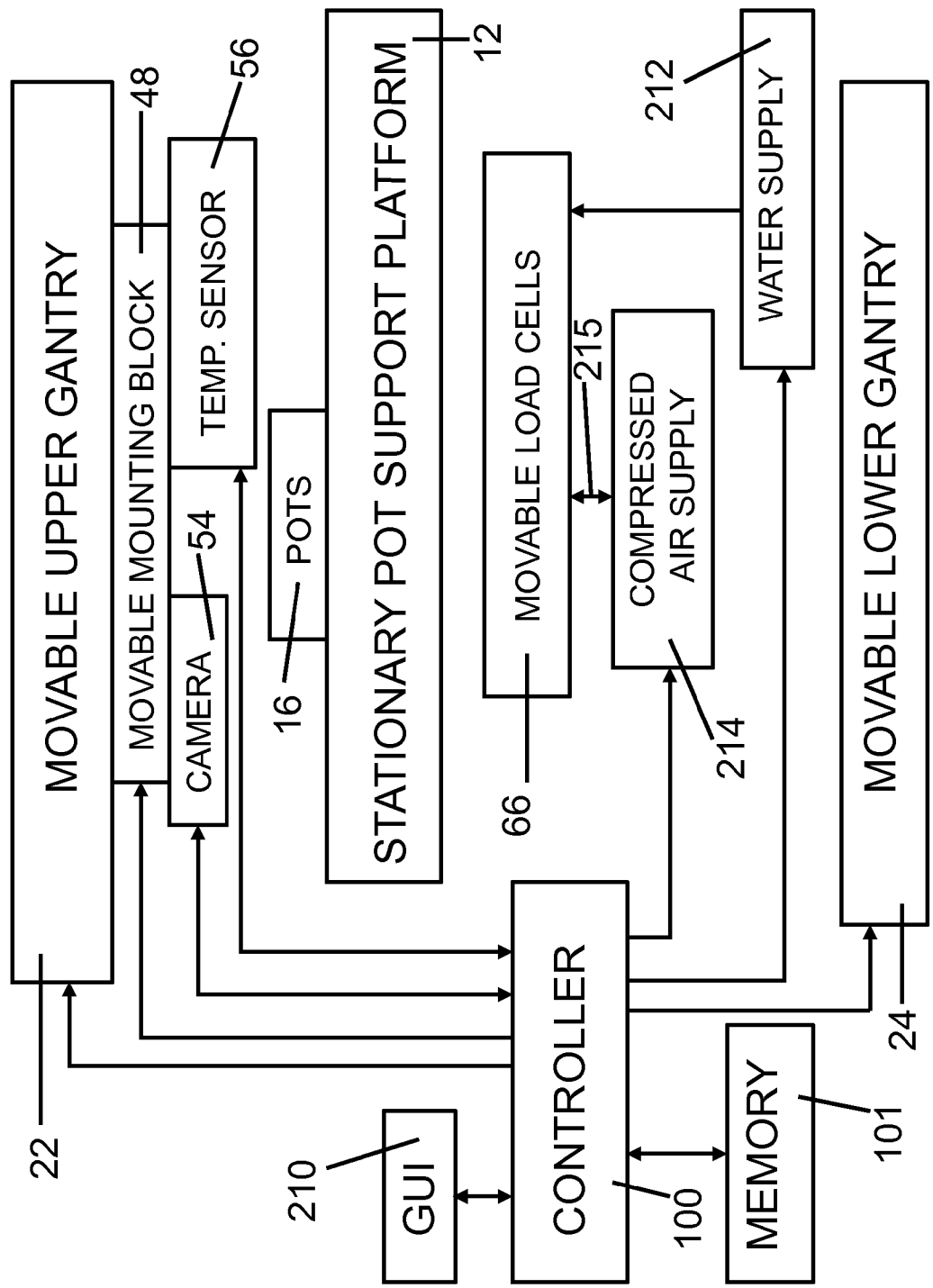
FIG. 14 is a block diagram illustrating additional components of one embodiment of the gravimetric screening platform system.

In an illustrated embodiment, a camera 54 and a temperature sensor 56, for example, are coupled to the universal mounting block 48 as shown in FIG. 14. Camera 54 provides still images or video images of the plants growing in pots 16 during an experiment. In one embodiment, camera 54 is a web camera which provides images to a remote location over a communication network. In an illustrated embodiment, the temperature sensor 56 is an infrared camera to provide thermal imaging of the plants within the pots 16 during the experiment. In one illustrated embodiment, a model A320 infrared camera system available from FLIR Systems is used as the temperature sensor 56. Other sensors may also be mounted to universal mounting block 48 to quantify plant stress level and/or canopy characteristics.

As discussed below, a system controller 100 is used to control the movement of upper gantry 22 and the universal monitoring block 48 during an experiment. Drive mechanism 28 moves the upper gantry 22 back and forth in the direction of double headed arrow 32 to align the horizontal support 46 of the upper gantry 22 with a desired row 38 of pots 16. Drive mechanism 50 then moves the universal mounting block 48 back and forth in the direction of double headed arrow 52 in FIGS. 1 and 3 over the particular row 38 to provide visual and thermal imaging, for example, with camera 54 and temperature sensor 56, respectively.

Details of the lower gantry 24 are best shown in FIGS. 4 and 5. Lower gantry 24 includes first and second moving supports or shuttle members 60 slideably coupled to spaced apart lower tracks 20 as best shown in FIG. 4. In an illustrated embodiment, shuttle members 60 slide back and forth on the track 20. Shuttle members 60 may include rollers, if desired. Drive mechanism 30 moves the lower gantry 24 back and forth in the direction of double headed arrow 32 along the longitudinal axis 13 of platform 12. Lower gantry 24 includes a pair of vertical support members 62 coupled to shuttle members 60 and a horizontal support 64 extending between the vertical support members 62.

A row of load cell modules 66 is coupled to the horizontal support 64 of lower gantry 24. The number of load cell modules 66 is equal to the number of openings 14 within each row 38 of the support platform 12. Drive mechanism 30 moves the lower gantry 24 so that the row of load cell modules 66 is aligned directly beneath a row 38 of pots 16 within openings 14 of platform 12. As discussed below, the load cell modules 66 are initially spaced apart from bottom surfaces of the pots 16 during movement of lower gantry 24. Once the lower gantry 24 is positioned beneath a particular row 38 of pots 16, pot support surfaces 86 of the load cell modules 66 are moved upwardly to engage bottom surfaces of pots 16 and lift the pots 16. The load cell modules 66 lift the pots 16 in order to weigh each pot 16 separately. As further discussed below, water can then supplied, as needed, through the load cell modules 66 and into bottom openings of the pots 16 to re-water to the pots 16 during an experiment. Therefore, the gravimetric screening platform system 10 and method of the present disclosure maintains the pots 16 at static locations throughout an experiment without requiring the pots 16 to be moved to a different location for weighing, testing and re-watering. While one row 38 of pots is lifted at a time in the illustrated embodiments, multiple rows 38 may be lifted simultaneously in other embodiments.

Figure 7:
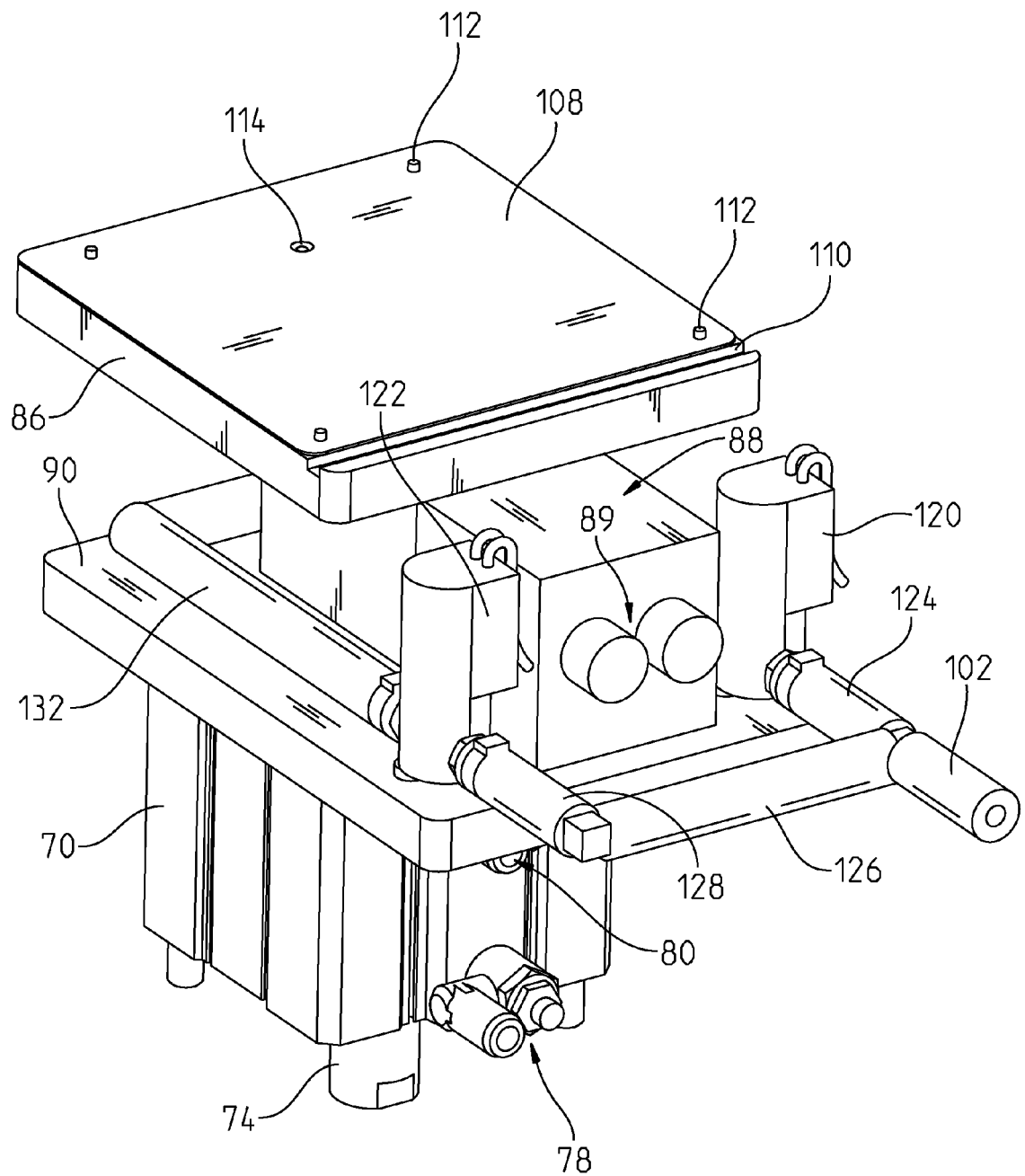
Figure 8:
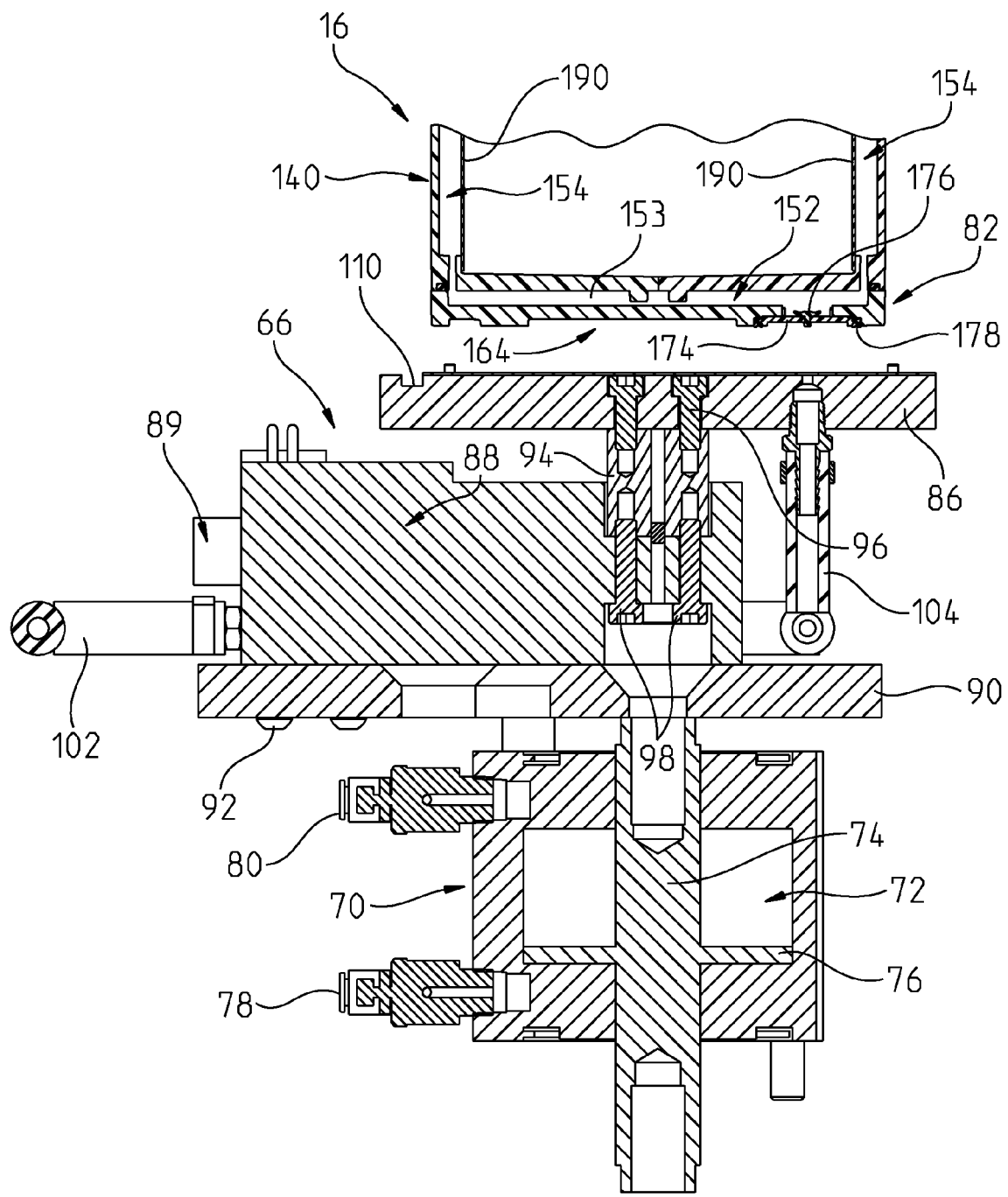
FIG. 8 is a sectional view taken through the load cell module of FIGS. 6 and 7 illustrating a pot support surface of the load cell in a refracted position spaced apart from a bottom surface of one of the pots of the gravimetric screening platform system.
Figure 9:
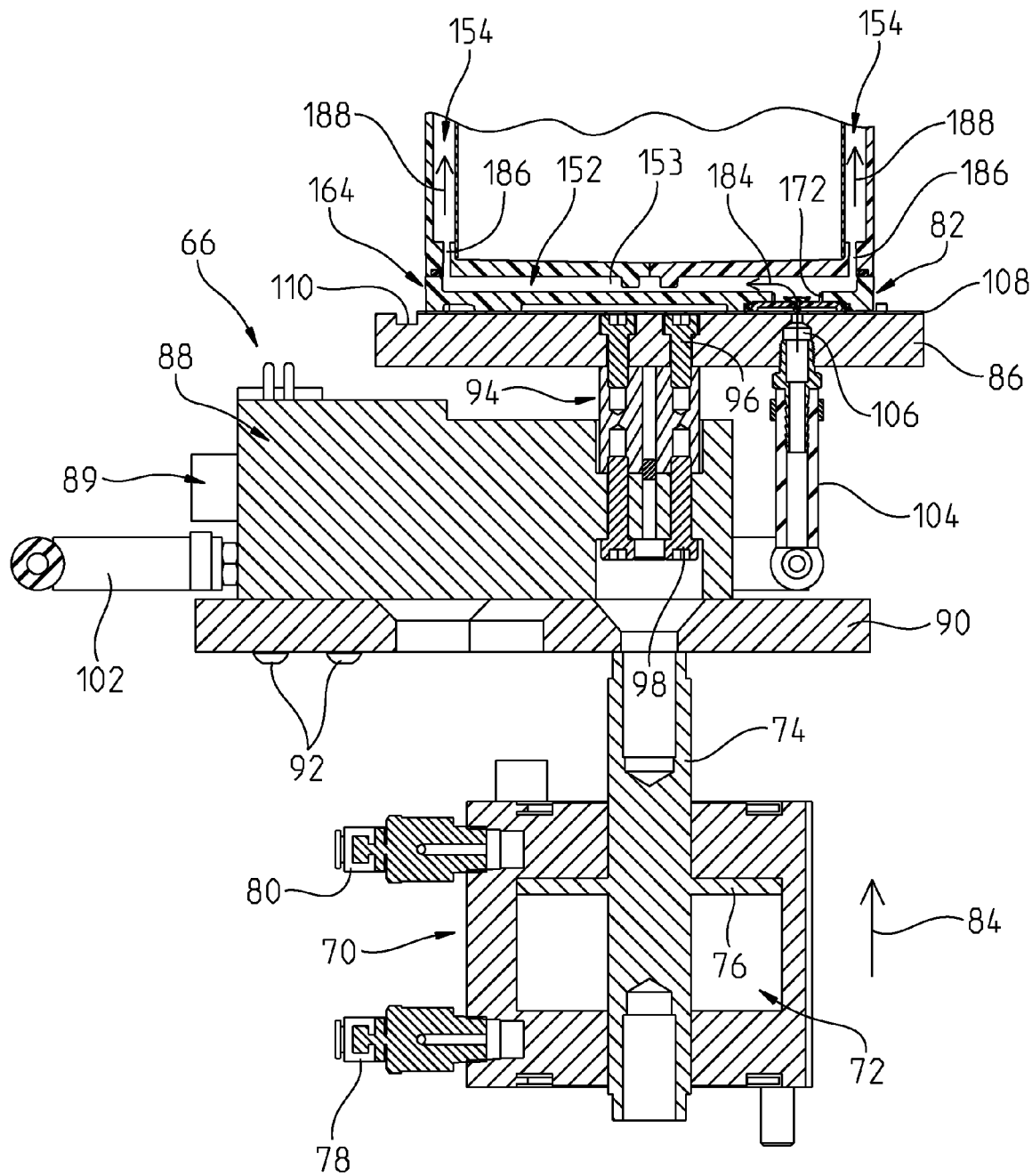
FIG. 9 is a sectional view similar to FIG. 8, in which the load cell pot support surface is moved to an upwardly extended position to lift the pot for weighing and watering the pot with the load cell module.
Figure 10:
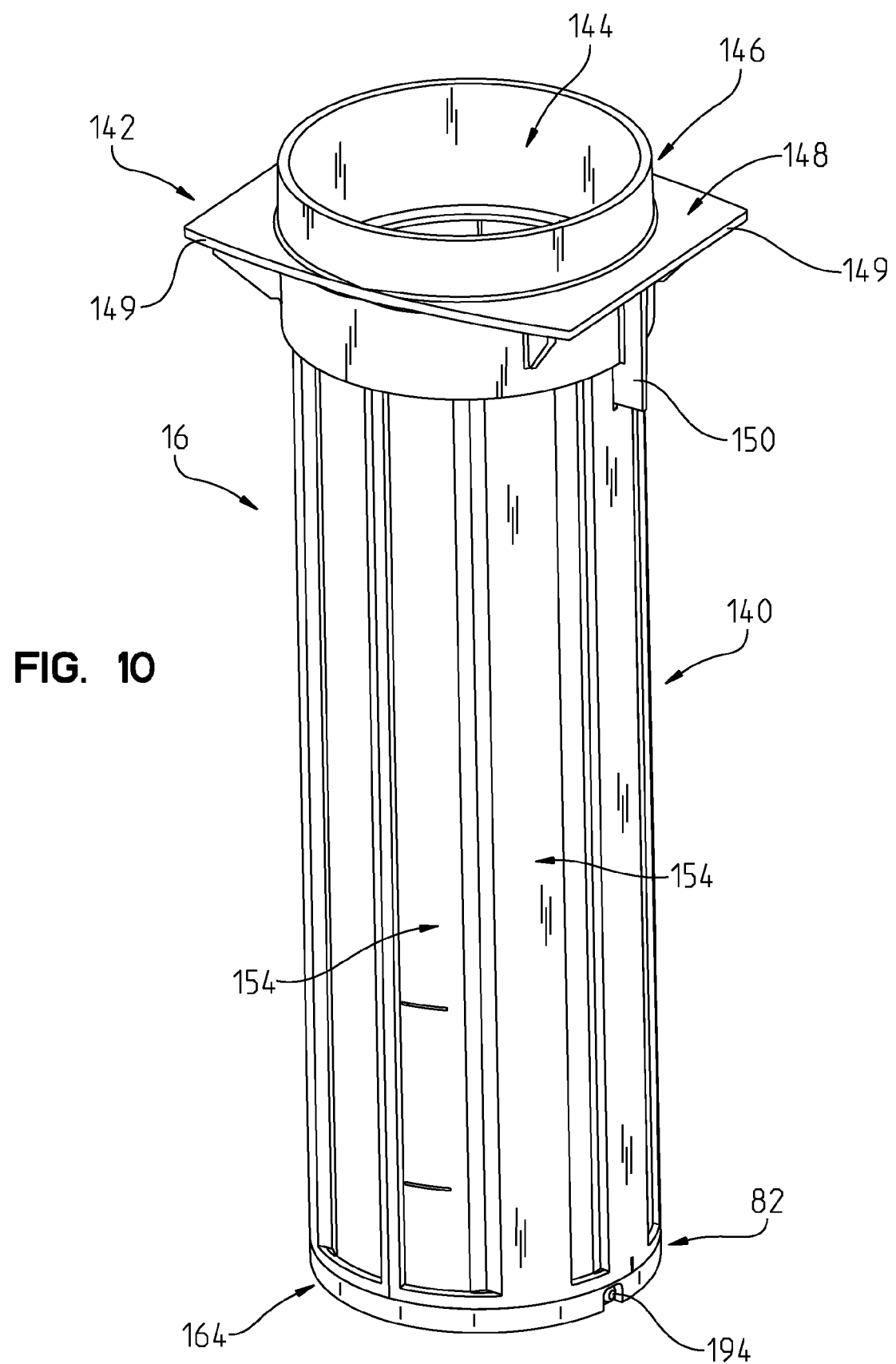
FIGS. 10 and 11 are perspective views of one of the pots used with the gravimetric screening platform system.
Figure 11:
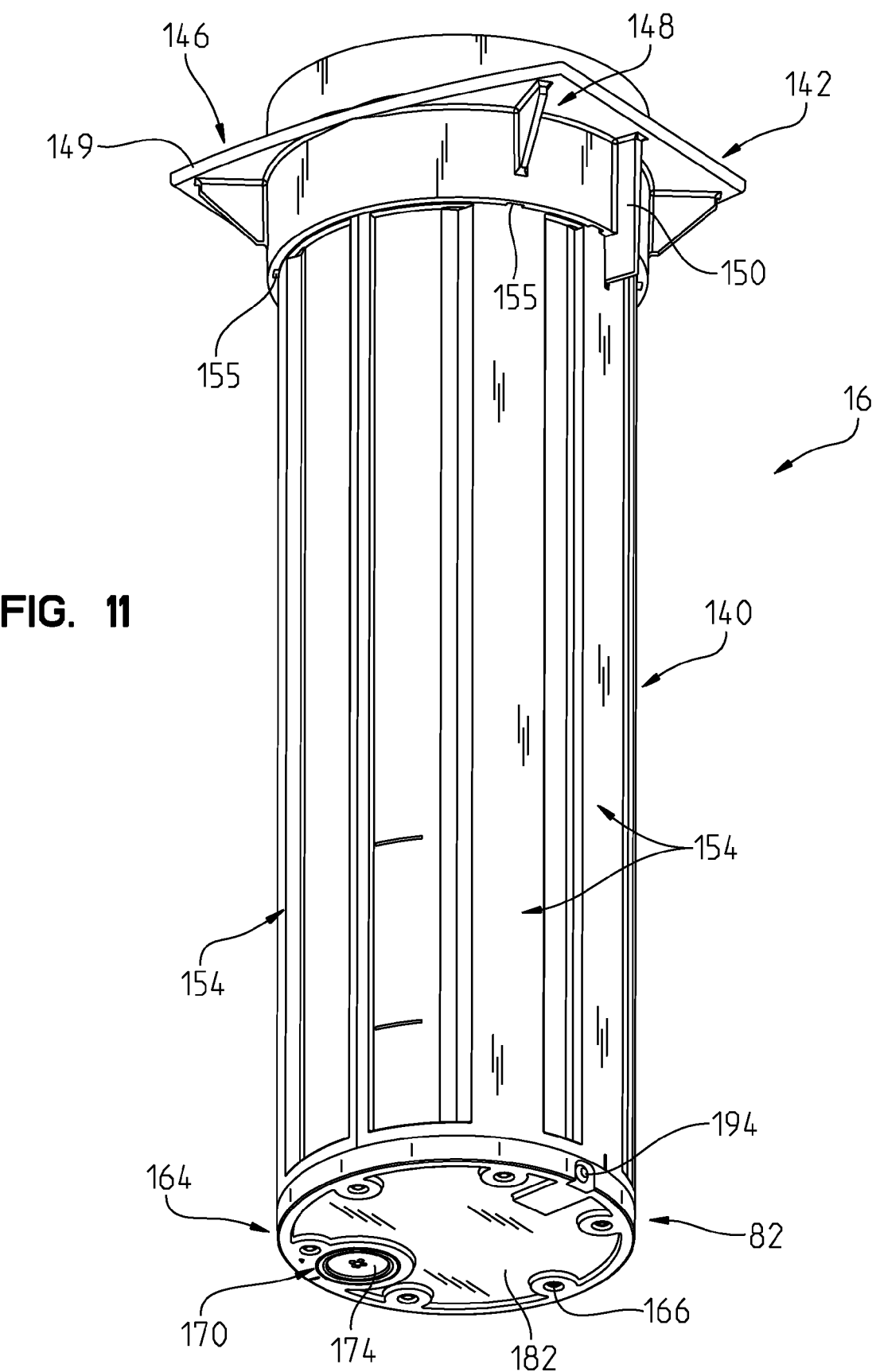

Details of the load cell modules 66 are illustrated in FIGS. 6-9. A lower cylinder 70 includes an internal chamber 72 as best shown in FIGS. 8 and 9. A movable piston 74 includes a plate 76 located within chamber 72. Fluid supply lines 78 and 80 are coupled to the chamber 70 to selectively supply fluid, such as compressed air or hydraulic fluid, to the internal chamber 72 of cylinder 70. Cylinder 70 is coupled to horizontal support 64 of lower gantry 24. FIG. 8 shows piston 74 in a refracted position in which a pot support 86 of module 66 is spaced apart from a bottom portion 82 of pot 16 as lower gantry 24 is moved to align the load cell modules 66 with the row 38 of pots 16.

In FIG. 9, compressed air from an air compressor 214 and supply line or manifold 215 is supplied through inlet 78 to move the piston 74 and plate 76 upwardly in the direction of arrow 84 to lift the load cell module 66 upwardly. One or more regulators are preferably coupled to the manifold 215. The pot support 86 therefore also moves upwardly in the direction of arrow 84 into engagement with the bottom surface 82 of pot 16 and lifts the pot 16 upwardly so that the pot 16 is supported by the support 86. Load cell modules 66 include a load cell 88 having a first end coupled to a base 90 by fasteners 92. Pot support 86 is coupled to an opposite end of load cell 88 by connector 94 and fasteners 96 and 98.

Once the pot 16 is lifted and supported by support 86, the load cell 88 weighs the pot 16. A controller 100 coupled to the load cell 88 by connectors 89 compares the actual mass of the pot 16 with a desired mass of the pot 16 for a particular experiment protocol. Controller 100 calculates a difference between actual water content within each pot 16 and the desired water content within the pot 16 based on the predetermined water deficit program of the particular experiment.

If controller 100 determines that water needs to be added to the pot 16, water can be added directly through the load cell module 66 without moving the pot 16 to another location. As shown in FIGS. 7 and 8, water supply line 102 is connected to first and second flow control valves 120 and 122 through conduits 124, 126 and 128. Conduit 130 is coupled between valve 120 and connector 104. Conduit 132 is coupled between valve 122 and connector 104. Water supply line 102 is coupled to a water supply 212. Connector 104 best shown in FIGS. 8 and 9 is coupled to an opening 106 in support 86.

In an illustrated embodiment, flow control valve 120 provides "coarse" fluid flow, while flow control valve 122 provides "fine" fluid flow. In one illustrated embodiment, fluid flow through course flow control valve 120 is about ten times greater than the fluid flow through fine control valve 122, although any desired ratio may be used. In operation, controller 100 initially opens both coarse and fine flow control valves 120 and 122 to begin filling or dosing the pots 16. As the weight of the pots approaches the desired weight for the particular experiment, controller 100 shuts off the coarse flow control valve 120 and finishes the fill operation using the fine flow control valve 122 to precisely control the amount of water added to the pot 16.

In an illustrated embodiment, a top surface of support 86 is covered with a silicone pad 108 to improve sealing between the bottom surface 82 of pot 16 and the pad 108 on top surface of support 86 so that water can be supplied to the pot 16. In an illustrated embodiment, posts 112 extend upwardly from the top surface of support 86 to hold the silicone pad 108 in place on the top surface of support 86. Pad 108 includes an aperture 114 aligned with aperture 106 of support 86 so that water can flow through the pad 108 and into the pot 16. Although silicone is used for pad 108 in one embodiment, other suitable materials can also be used. Support 86 of load cell module 66 also includes a groove or notched portion 110 which is configured to collect water and drain the water away from electrical components of the load cell module 66.

Details of an exemplary embodiment of a pot 16 are shown in FIGS. 10-13. The pot 16 include a body portion 140 which is generally cylindrically shaped. The body portion 140 of the pot 16 is designed to fit within the openings 14 of platform 12 with enough clearance so that when the load cell module 66 lifts the pot 16, the pot 16 is entirely supported by the support 86 of load cell module 66 to permit accurate weighing of the pot 16. A top end 142 of pot 16 includes an opening 144 to insert soil and seeds or plants into the pot 16 and permit the plant (not shown) to grow outwardly from the pot 16 in a conventional manner. Top end 142 includes an end cap 146 having an outer flange 148 configured to engage a top surface of the support platform 12 when the pot 16 is loaded into an opening 14. Opposite sides 149 of flange 148 are curved to facilitate loading and unloading the pots 16 on the platform 12.

Figure 12:
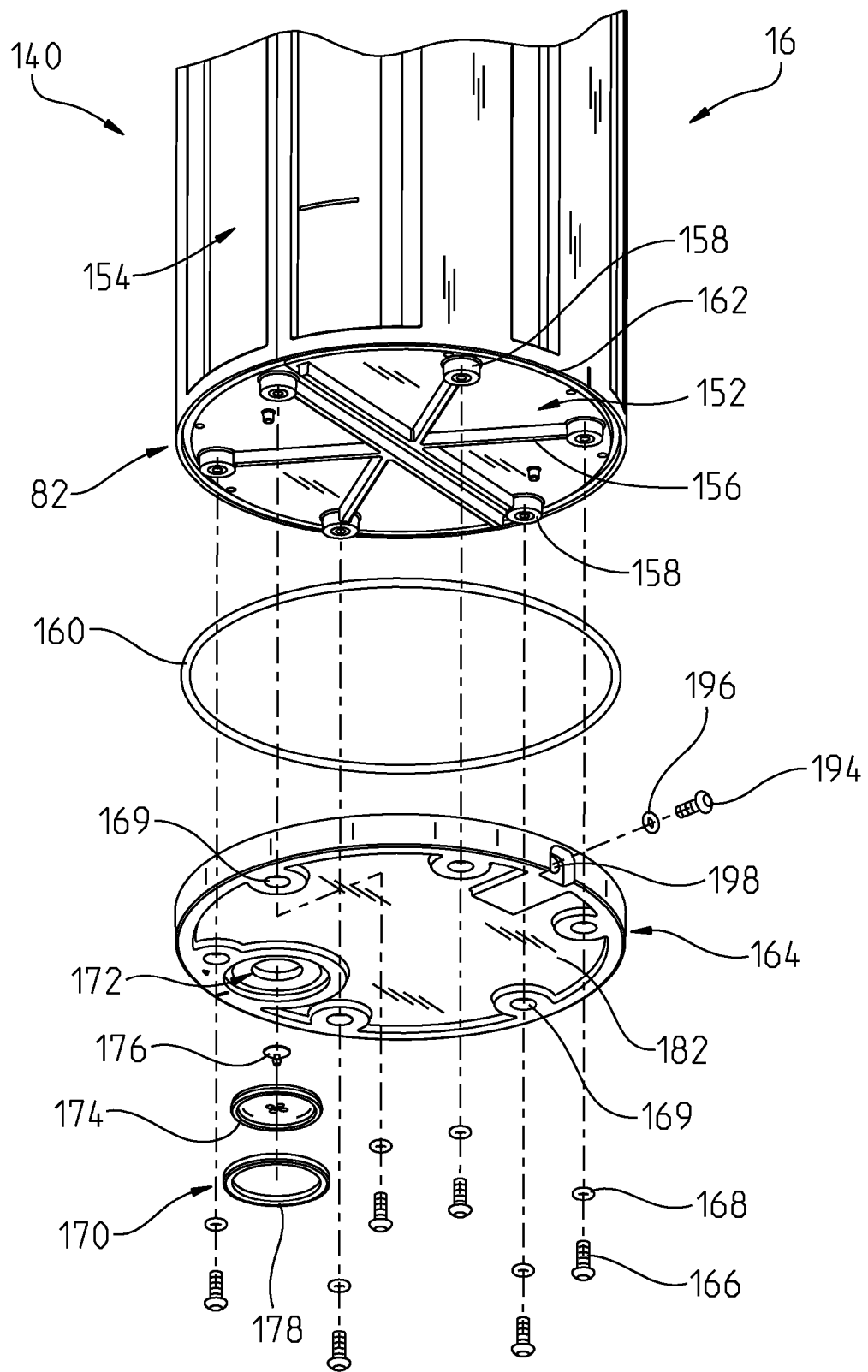
FIG. 12 is an exploded perspective view showing a bottom end cap of a fluid reservoir including a check valve to permit water to be supplied from the load cell module to the pot.

An alignment tab 150 is also formed on end cap 146. The alignment tab 150 is configured to be aligned with a notch 40 of openings 14 so that the pot 16 is located in a proper orientation on the support platform 12 for weighing and re-watering. Pot 16 includes an internal water reservoir 152 including a bottom portion 153 and a plurality of spaced apart vertical fluid channels 154 for receiving water therein. Bottom end 82 of pot 16 includes a plurality of ribs 156 and threaded mounting members 158 as shown in FIG. 12. An O-ring 160 is located within an annular groove 162 surrounding the bottom end 82 of pot 16. An end cap 164 is coupled to bottom end 82 by fasteners 156 which extend through O-rings 168 and openings 169 in cap 164 and engage threaded mounting members 158.

In an illustrated embodiment, a check valve 170 is coupled to an opening 172 formed in bottom plate 164. Illustratively, a diaphragm 174 and umbrella valve 176 are coupled to the opening 172 by an O-ring seal 178. As best shown in FIGS. 8 and 9, the O-ring seal 178 extends below bottom surface 82 of pot 16 to engage the silicone pad 108 on the top surface of support 86 to provide a seal between the opening 72 and the pad 108 on top surface of support 86.

Figure 13:
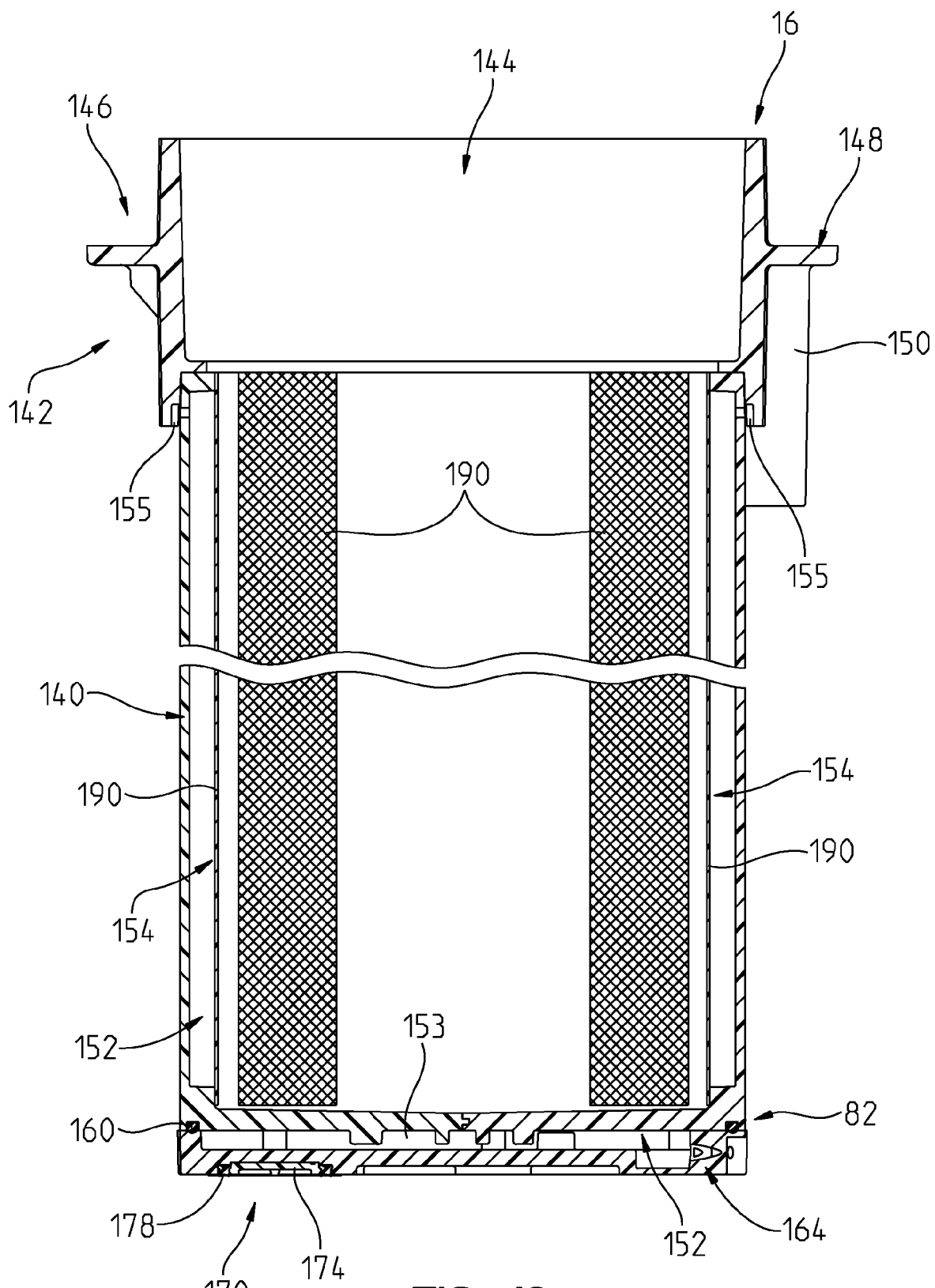
FIG. 13 is a sectional view, with portions broken away, of the pot of FIGS. 10-12.

By placing the tabs 150 of pots 16 into notches 40 of openings 14, the openings 172 into reservoirs 152 of pots 16 are automatically aligned with openings 106 in the supports 86 of load cell modules 66 as best shown in FIG. 9. Therefore, when the pot 16 is lifted as shown if FIG. 9, a fluid connection is automatically made between aperture 106 in support 86 and opening 172 of end cap 164 at the bottom end 82 of pot 16. When controller 100 causes water to flow by opening valves 120, 122, water flows upwardly through connector 104, through the opening 106 of support 86, through diaphragm 174 and past the check valve 176, and into the reservoir 152 of pot 16. Fluid flow is illustratively shown by arrow 184 in FIG. 9. Also as illustrated in FIG. 9, fluid flows in the direction of arrows 188 upwardly from lower portion 153 of reservoir 152 through openings 186 which are in fluid communication with vertical fluid channels 154. Channels 154 include upper openings 155 located near top end 142 to drain any water if an overfill condition occurs. As best illustrated in FIGS. 8, 9 and 13, the internal fluid channels 154 includes an internal synthetic fabric mesh 190 forming an inner portion of the channels 154. The mesh 190 permits water to flow through the mesh but prevents soil, debris, or plant roots from accumulating in the vertical channels 154 of the reservoir 152. A removable drain plug 194 and o-ring 196 seal a drain opening 198 of end cap 164. Reservoir 152 is drained by removing the drain plug 194.

In another illustrated embodiment of the pot 16, the reservoir 152 is in fluid communication with a tube or channel (not shown) which delivers water from the reservoir 152 to the top end 142 of pot 16 for top watering of the plant within the pot. In this embodiment, the pot 16 does not typically include the fluid channels 154 or mesh 190. In yet another embodiment, the mesh 190 is replaced with a water impermeable material so that water flows from the reservoir 152 up the channels 154 in the direction of arrows 188 to top openings (not shown) adjacent top end 142 of pot 16 to provide top watering of the plant within the pot through the channels 154.

In operation, the pots 16 are filled with soil, seeds and/or plants as desired for the particular experiment and loaded into the openings 14 of the support platform 12. Tabs 150 of pots 16 are aligned with notches 40 of openings 14. As best shown in FIG. 3, a loading platform 200 includes movable supports 202 coupled to upper track 18. Supports 202 are coupled to a horizontal support 204 which supports folding panels 206. In one embodiment, the loading platform 200 is moved by a drive mechanism back and forth in the direction of double headed arrow 32 along the longitudinal axis 13 of platform 12. In another illustrated embodiment, the loading platform 200 is coupled to the upper gantry 22 by connecting arms. Therefore, the upper gantry 22 is used to move the loading platform 200 back and forth on platform 12 to facilitate loading of the pots 16 into the openings 14. One embodiment facilitates loading and unloading of the pots 16 at an end of the support platform 12. Also in an illustrative embodiment, the foldable panels 206 permit loading and unloading of pots 16 at a more ergonomic, lower level than the full height of support platform 12.

A center portion 208 of loading platform 200 is opened to expose a row 38 of openings 14. Once the loading platform 200 is located over a particular row 38, the side panels 206 are folded downwardly to overlie adjacent rows 38 of openings 14. Therefore, an operator can walk on the panels 206 to facilitate loading or unloading of pots 16 from openings 14 of the exposed row 38. After one row 38 is loaded with pots 16, the loading platform 200 is moved to the next row 38. The panels 208 are illustratively folded upwardly before the loading platform 200 is moved.

Once all the pots 16 are loaded into the support platform 12, an operator selects a particular experiment protocol. The experiment can be selected and monitored using a graphical user input (GUI) 210. GUI 210 is shown as a touch screen in FIGS. 1-3. However, GUI 210 may include any type of user input.

Operation of the gravimetric screening platform system 10 and method will now be described in connection with FIGS. 14 and 15. Once the pots 16 have been loaded and the particular experiment protocol has been selected using graphical user interface 210, controller 100 automatically controls movement of the upper gantry 22, the lower gantry 24, and the universal mounting block 48 relative to the support platform 12. Controller 100 also controls the supply of water from a water supply 212 and compressed air from air compressor 214 to the load cell module 66 coupled to the lower gantry 24.

Figure 15:
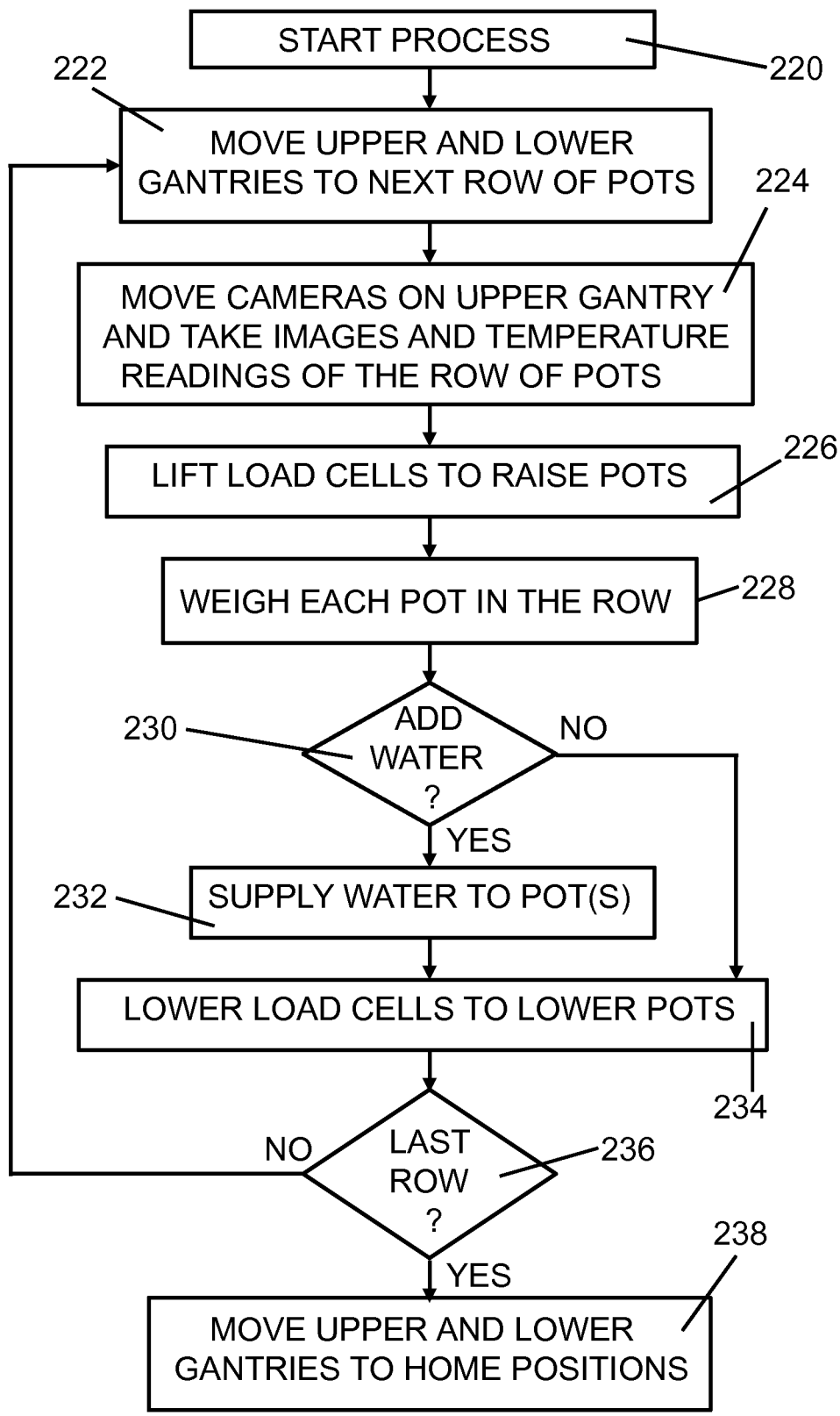
FIG. 15 is a flow chart illustrating steps performed during operation of the gravimetric screening platform system and method.

Referring now to FIG. 15, the experiment process starts at block 220. The upper and lower gantries 22 and 24 are illustratively located near one end of the support platform 12 at the start of the process. The gantries 22 and 24 are moved into alignment with the next row 38 of openings 14 and pots 16 as illustrated at block 222. Controller 100 then controls movement of the universal mounting block 48 on the horizontal support 46 of upper gantry 22. Controller 100 takes images of the plants within pots 16 using camera 54 and takes temperature readings using infrared sensing camera 56 as the universal mounting block 48 moves the cameras 54, 56 back and forth over the plants within a particular row 38 as illustrated at block 224. In an illustrated embodiment, the camera 54 and temperature sensor 56 are located within a heat protected enclosure so that the cameras 54 and 56 are not damaged by heat supplied within the greenhouse. Data from cameras 54, 56 and any other sensors is stored in memory 101 by controller 100.

Once the lower gantry 24 is moved into position underneath the particular row 38, controller 100 controls the supply of compressed air from air supply 214 to cylinders 70 to raise each of the plurality of load cell modules 66 from the refracted position of FIG. 8 to the extended position of FIG. 9 to lift each pot 16 in the row 38 upwardly as illustrated at block 226. As discussed above, the pots 16 are entirely supported by the supports 86 of load cell modules 66 in the extended positions.

Controller 100 then weighs each pot as illustrated at block 228 and stores the weight information for each pot 16 in memory 101. Next, controller 100 determines whether it is necessary to add water to any of the pots 16 as illustrated at block 230. If no water needs to be added, controller 100 advances to block 234 of FIG. 15. If water needs to be added at block 230, controller 100 controls valves 120, 122 to supply water from water supply 212 through the load cell modules 66 and into the pots 16 as discussed in detail above. Water is added until the weight of the pots reaches the desired weight for the particular experiment as illustrated at block 232. The new pot weights taken after re-watering are stored in memory 101. Next, controller 100 controls the air supply 214 to move the pistons 74 of load cell module 66 from the extended position of FIG. 9 back to the retracted position of FIG. 8 as illustrated at block 234. In this position, the pots 16 are again supported by flanges 148 which engage the support platform 12.

Controller 100 then determines whether the particular row 38 is the last row 38 on the support platform 12 as illustrated at block 236. If so, controller 100 moves the upper and lower gantries 22 and 24 back to a home position as illustrated at block 238. If the row was not the last row at block 236, controller 100 moves the upper and lower gantries 22, 24 to the next row 38 at block 222 and then proceeds with the remaining steps of FIG. 15 for the next row 38.

During the re-watering process, nutrients can be added to the soil, if desired. In addition, water can be used to flush nutrients out of the pots 16 by overfilling the reservoirs and allowing water to escape through overflow openings 155. Nitrogen use efficiency (NUE) experiments may be conducted.

As best shown in FIGS. 1-3, outer sensors 240 and 242 create light barriers to detect movement near the system 10. If the detectors 240 and 242 detect such movement, controller 100 shuts off operation of the system 10. Once the area is clear, controller 100 starts the process again at the same step in the procedure.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A system for controlling soil moisture in a plurality of potted plants to perform water deficit experiments, the system comprising:
    a stationary platform having a plurality of openings formed therein, the openings being located in a plurality of rows on the platform;
    a plurality of pots located in the plurality of openings in the platform, the pots being supported by the platform;
    a movable lower gantry located below the platform, the movable lower gantry supporting a plurality of load cell modules aligned with the plurality of pots located in a row of openings, each load cell module including a load cell having a support movable from a retracted position spaced apart from a bottom surface of an associated pot to an extended position in which the support of the load cell lifts the associated pot upwardly to support the weight of the pot thereon, the load cell weighing the lifted pot, each support being formed to include an aperture aligned with a fill opening in the bottom surface of the associated pot and a connector in fluid communication with the aperture;
    a controller coupled to the load cell, the controller being programmed to determine whether the pots need watering based on the weights of the pots and the water deficit experiment; and
    a water supply coupled to the connector of each load cell module support, the water supply including at least one flow control valve controlled by the controller to selectively supply water through the connector and aperture of each load cell module support to the associated pot.

2. The system of claim 1, further comprising an upper gantry movable above the platform, the upper gantry including at least one sensor located thereon to acquire data related to the plants in the plurality of pots.

3. The system of claim 2, wherein the at least sensor on the upper gantry includes a camera to take images of the plants in the plurality of pots.

4. The system of claim 2, wherein the at least sensor on the upper gantry includes a temperature sensor.

5. The system of claim 4, wherein the temperature sensor is an infrared camera.

6. The system of claim 2, wherein the upper gantry includes a drive mechanism which moves the at least one sensor back and forth on the upper gantry over the rows of pots located within the openings of the platform.

7. The system of claim 2, wherein the upper gantry includes first and second spaced apart shuttle members coupled to spaced apart upper tracks located on opposite sides of the platform to permit movement of the upper gantry over the platform, first and second spaced vertical supports coupled to the first and second shuttle members, respectively, and a horizontal support extending over the platform between the first and second spaced vertical supports of the upper gantry, the at least one sensor being coupled to the horizontal support of the upper gantry.

8. The system of claim 1, wherein the lower gantry includes first and second spaced apart shuttle members coupled to spaced apart lower tracks located on opposite sides of the platform to permit movement of the lower gantry under the platform, first and second spaced vertical supports coupled to the first and second shuttle members, respectively, and a horizontal support extending under the platform between the first and second spaced vertical supports of the lower gantry, the plurality of load cell modules being coupled to the horizontal support of the lower gantry.

9. The system of claim 8, wherein the horizontal support of the lower gantry supports a fluid supply line coupled to the load cell modules for selectively extending and retracting the supports of the load cell modules, and a water supply line coupled to the connector of each load cell module support to supply water to the pots through the load cell modules.

10. The system of claim 9, wherein each of the plurality of pots includes a fluid reservoir having in communication with the fill opening located on the bottom surface of the pot and a check valve coupled to the fill opening to permit water supplied through the aperture of the support of the load cell module to enter the fill opening of the pot through the check valve.

11. The system of claim 10, wherein the fluid reservoir of each pot includes a bottom portion in communication with the fill opening and a plurality of vertically extending fluid channels to supply water to the soil within the pot.

12. The system of claim 11, further comprising a mesh forming an inner portion of the vertically extending fluid channels, the mesh permitting water to flow through the mesh to the soil, but preventing soil debris and plant roots from accumulating in the vertically extending fluid channels of the reservoir.

13. The system of claim 11, further comprising an overfill opening in communication with each of the fluid channels, the overfill openings being located near a top end of the pot.

14. The system of claim 10, wherein the fill openings of the pots are offset from a center axis of the pots, and wherein each pot includes an alignment tab configured to be located within a notched portion of the opening formed in the platform to align the fill opening of the pot with the water supply aperture in the support of the load cell module.

15. The system of claim 10, further comprising a pad located on the support of each load cell module, the pad improving a seal between the fill opening of the pot and the water supply aperture formed in the support of the load cell module.

16. The system of claim 15, wherein the pad includes an opening aligned with the water supply aperture in the support of the load cell module.

17. The system of claim 16, wherein the support of the load cell module includes a plurality of posts configured to align the pad on the support.

18. The system of claim 1, wherein the support of the load cell module includes a notched portion configured to drain fluid off the support.

19. The system of claim 1, wherein each load cell module includes a cylinder and a piston located in the cylinder, the piston being coupled to the load cell and movable between a retracted position and an extended position to move the load cell and the support from the retracted position spaced apart from the bottom surface of a pot to the extended position in which the support of the load cell lifts the pot upwardly to support the weight of the pot thereon.

20. The system of claim 1, wherein each pot includes a cylindrically shaped body portion and a flange located at top end of the pot, the flange being configured to engage the platform when the body portion of the pot is inserted into the opening in the platform to support the pot on the platform.

21. The system of claim 1, further comprising a loading platform movable relative to the stationary platform, the loading platform including at least one foldable panel configured to overlie a plurality of rows of openings of the platform to facilitate loading of pots into the openings located adjacent the foldable panel.

22. The system of claim 1, wherein the water supply is coupled to each load cell module by first and second flow control valves, the first flow control valve having a fluid flow rate greater than the second flow control valve, and wherein the controller initially opens both the first and second flow control valves to begin filling the pots, the controller closing the first flow control valve as the weight of the pots approaches a desired weight for the water deficit experiment and finishes the filling the pot with the second flow control valve to precisely control the amount of water added to the pot.

* * * * *